(No Model.)
A. H. FRANCK.
Straw Cutter.
No. 235,423. Patented Dec. 14, 1880.
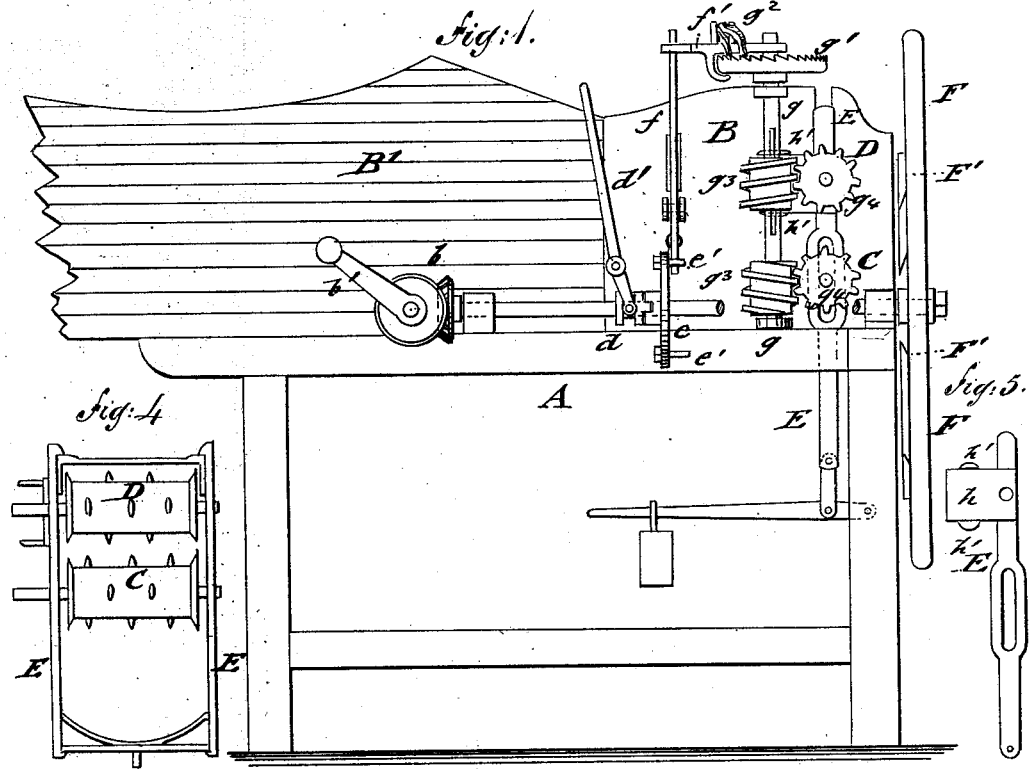
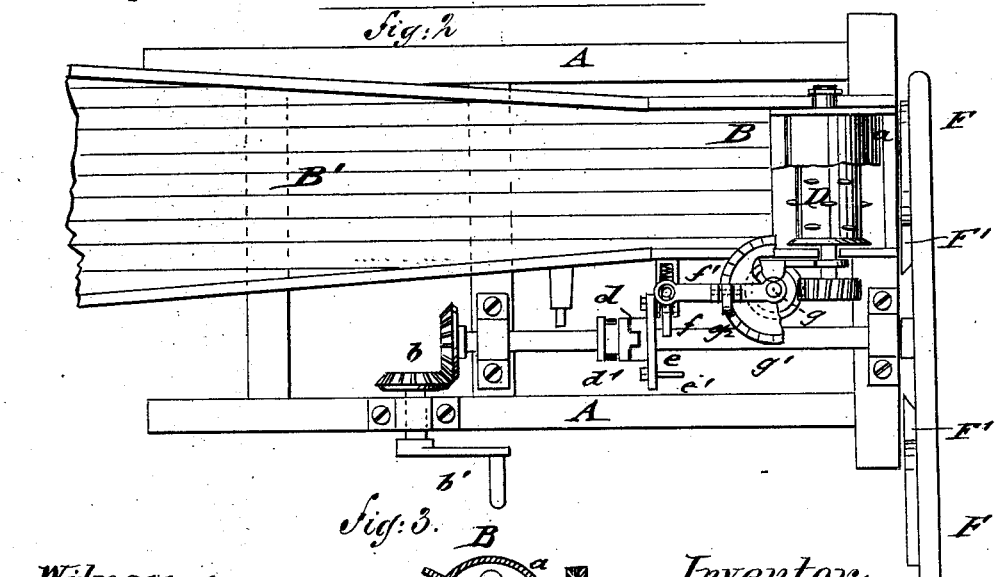
Witnesses:
Carl Kass
Otto Risch
Inventor:
August Henry Franck
by Paul Goepel.
Attorney.

UNITED STATES PATENT OFFICE.

AUGUST H. FRANCK, OF SHEBOYGAN, WISCONSIN.

STRAW-CUTTER.

SPECIFICATION forming part of Letters Patent No. 235,423, dated December 14, 1880.

Application filed August 16, 1880. (No model.)

*To all whom it may concern:*

Be it known that I, AUGUST HENRY FRANCK, of Sheboygan, in the county of Sheboygan and State of Wisconsin, have invented certain new and useful Improvements in Straw-Cutters, of which the following is a specification.

This invention has reference to an improved construction of straw and feed cutters, in which the straw or feed to be cut is fed forward and cut twice at each revolution of the knives, the straw or feed being held at the same time properly compressed for the action of the knives.

The fly-wheel, which carries the radial cutting-knives, passes transversely across the contracted mouth-piece of the feed-box, and is set in motion by a hand-gear applied to its shaft. The feed-rollers are intermittently rotated from the feed-wheel shaft by an actuating-disk, a fulcrumed and spring-acted transmitting-lever with drop-pawls or dogs, and a ratchet-wheel at the end of an upright worm-wheel shaft, the worm-wheels of which mesh with cog-wheels on the shafts of the feed-rollers. The vertically-sliding guide-frame of the upper roller engages, by a side plate and lugs, the upper worm-wheel, which is made to slide on its shaft, but secured against axial motion, so as to follow the up-and-down motion of the upper feed-roller, while always transmitting rotary motion to the same.

In the accompanying drawings, Figure 1 represents a side elevation of my improved straw and feed cutter; Fig. 2, a top view of the same with parts broken off; Fig. 3, a detail vertical transverse section of the feed-rollers and the feed-box. Fig. 4 is a detail front view of the vertically-sliding guide-frame of the upper feed-roller, and Fig. 5 a detail side view of the guide-frame and connecting-lugs.

Similar letters of reference indicate corresponding parts.

A in the drawings represents the supporting frame of my improved straw and feed cutter. This frame is made of wood, of suitable size and strength, and arranged to carry a cast-iron feed-box, B, which is firmly screwed to one end of frame A, and provided at its rear end with an outwardly-flaring extension or guide-box, B', of wood, for receiving the straw or feed.

At the front part of the cast-iron feed-box B is arranged a lower feed-roller, C, which turns in fixed bearings of the feed-box B, and above the same a second feed-roller, D, which turns in bearings of a vertically-sliding guide-frame, E. The shaft of the upper feed-roller, D, passes through slots of the feed-box B, so as to be able to move up and down in the same, according to the position of the feed-roller D. The guide-frame E is slotted at its middle portions where it passes over the shaft of the lower feed-roller, C, so as to move up and down without interfering with the shaft of the same.

The guide-frame is rigidly braced by transverse top and bottom pieces, as shown in Fig. 4, and connected at its lower end, by a pivot-link, with a lever carrying a weight at its longer arm, so that by adjusting the weight to a greater or less distance from the fulcrum of the lever the upper feed-roller is pressed with greater or less force upon the straw or feed that is fed forward by the feed-rollers in the feed-box.

The feed-box B is provided with a contracted mouth-piece, $a$, as shown in Fig. 3, in front of which and close thereto the cutting-knives F' are passed, which are applied to radial arms of the transverse fly-wheel F. The shaft of the fly-wheel turns in bearings of the supporting-frame A, and is arranged parallel to the axis of the feed-box B B'. The fly-wheel and its cutting-knives are revolved by means of bevel-gear and hand-crank $b$ $b'$, at the rear end of the fly-wheel shaft, the main portion of the shaft being thrown in and out of gear with the rear portion, carrying the bevel-wheel, by a clutch device and hand-lever, $d$ $d'$, as shown clearly in Figs. 1 and 2.

Adjoining the clutch a disk, $e$, is keyed to the main portion of the fly-wheel shaft, said disk being provided with projecting pins $e'$ at diametrically opposite points, which engage a fulcrumed lever, $f$, the upper end of which is applied to an oscillating arm, $f'$. This arm $f'$ is pivoted to the upper end of a vertical shaft, $g$, which turns in side bearings of the feed-box B, and carries at its upper end, below the oscillating arm, a fixed horizontal ratchet-wheel, $g'$. The oscillating arm $f'$ is guided along the ratchet-wheel and provided with drop-pawls $g^2$, for engaging the ratchet-wheel at each forward motion of the oscillating arm $f'$. The pawls are returned by the return motion of the oscillating arm $f'$ and $f$, which return motion is imparted by a spring interposed between the feed-box B and the lower end of the fulcrumed lever $f$ as soon as the pin $e'$ of the revolving disk $e$ has released the lower end of the lever $f$. Upon the vertical shaft $g$ of the ratchet-wheel $g'$ are placed a lower fixed and an upper sliding worm-wheel, $g^3$, on the ends of the feed-rollers C and D. The upper worm-wheel, $g^3$, slides on the shaft $g$, permitted by means of a tongue-and-groove connection, and is engaged by projecting lugs $h'$ of a side plate, $h$, of the vertically-sliding guide-frame E, for the purpose of following the up-and-down motion of the upper feed-roller without changing its position axially on the ratchet-wheel shaft. The upper worm wheel, $g^3$, is by this arrangement always in gear with the cog-wheel of the upper feed-roller, so as to revolve the same jointly with the lower feed-roller during the various positions which it assumes by the up-and-down motion of the feed-roller, in consequence of the varying thickness of the straw or feed in the feed-box drawn through between the feed-rollers.

When the clutch has been thrown into gear with the main portion of the fly-wheel shaft, the straw or feed to be cut is placed in position in the feed-box and the driving-gear is set in motion. The straw or feed is then taken up by the projecting teeth or studs of the feed-rollers and fed forward to the transversely-revolving cutting-knives by the pressure of the feed-rollers thereon. At each revolution of the fly-wheel the feed-rollers are moved twice by the action of the disk and pins, and stopped twice for the cutting action of the two rotating knives of the fly-wheel.

The contracted mouth $a$ of the feed-box is preferably convexly curved, so as to prevent the wrapping of the straw or feed around the rollers.

The pins of the rotating disk are adjustable in radial slots of the same, for the purpose of cutting the straw or feed to greater or less lengths, as desired. The nearer the pins are adjusted to the circumference of the disk the longer will the feed be cut, and the nearer to the center the shorter the feed will be cut, as by the position of the pins the stroke of the transmitting-lever and the motion of the transmitting worm-wheel are regulated.

Each feed-roller is made of four parts, of two semi-circular roller-sections and two flanged heads, which are screwed to the ends of the roller-sections and keyed to the roller-shafts. The upper feed-roller is always pressed at a right angle upon the feed, keeping it firmly pressed between it and the lower feed-roller, so as to conduct it to and hold it for the action of the cutting-knives at the mouth of the feed-box.

Having thus described my invention, I claim as new and desire to secure by Letters Patent—

In a straw and feed cutter, the upper feed-roller and its vertically-sliding and weighted guide-frame having a side plate, $h$, with projecting lugs $h'$, in combination with a sliding but axially-keyed worm-wheel, engaged and moved by said lugs and suitable transmitting mechanism, substantially as set forth.

In testimony that I claim the foregoing as my invention I have signed my name, in presence of two witnesses, this 10th day of August, 1880.

AUGUST HENRY FRANCK.

Witnesses:
JOHN MESSNER,
AUGUST KRUSE.